(No Model.)
J. HARMON & G. W. FABER.
NUT LOCK.
No. 508,823. Patented Nov. 14, 1893.
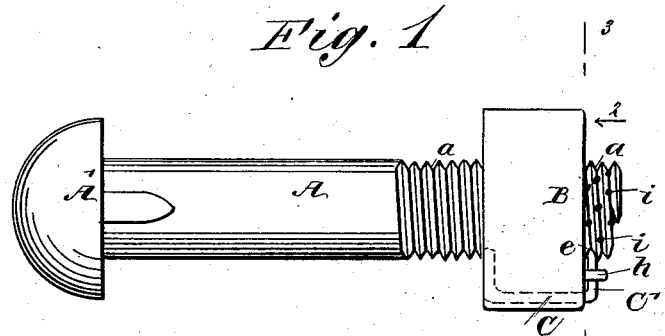
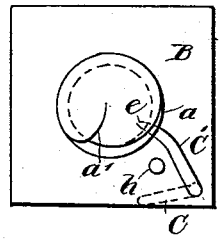
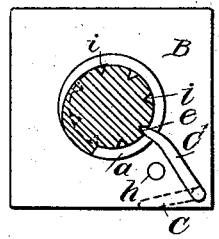
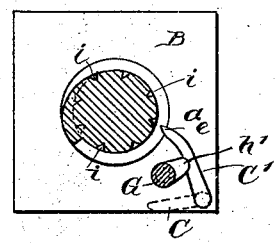
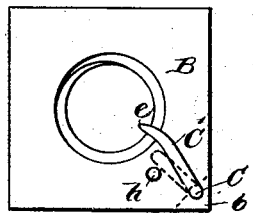
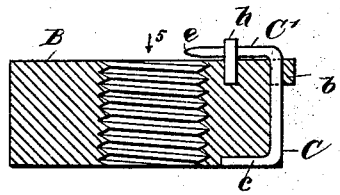
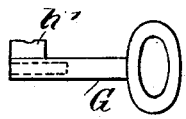
WITNESSES:
C. Neveux
C. Sedgwick
INVENTORS
J. Harmon
G. W. Faber
BY
Munn & Co
ATTORNEYS.
THE NATIONAL LITHOGRAPHING COMPANY,
WASHINGTON, D. C.

UNITED STATES PATENT OFFICE.

JOSEPH HARMON AND GEORGE W. FABER, OF DULUTH, MINNESOTA.

NUT-LOCK.

SPECIFICATION forming part of Letters Patent No. 508,823, dated November 14, 1893.

Application filed June 3, 1893. Serial No. 476,511. (No model.)

*To all whom it may concern:*

Be it known that we, JOSEPH HARMON and GEORGE W. FABER, of Duluth, in the county of St. Louis and State of Minnesota, have invented a new and useful Improved Nut-Lock, of which the following is a full, clear, and exact description.

Our invention relates to an improved nut lock, for the nuts of bolts used to secure the fish plates of railroad rails upon said rails, and for other uses of a like nature; and has for its objects to provide a novel, simple, and effective nut lock, and also to provide novel means for the release of a locked nut when it is to be removed from the bolt it engages.

To these ends, our invention consists in the peculiar construction and combination of parts, as is hereinafter described and claimed.

Reference is to be had to the accompanying drawings, forming a part of this specification, in which similar letters of reference indicate corresponding parts in all the figures.

Figure 1 is a side view of a bolt, and a nut locked thereon by the improved device. Fig. 2 is an end view of the bolt, nut and locking device, opposite the arrow 2, in Fig. 1. Fig. 3 is a transverse section of the bolt, on the line 3—3 in Fig. 1, showing the nut and the improved locking device thereon, in locked adjustment. Fig. 4 is a similar view with the locking device released from the bolt by an appliance also shown partly in section, in said figure. Fig. 5 is an end view of the detached nut and the improvement thereon, opposite the arrow 5, in Fig. 6. Fig. 6 is a transverse sectional view of the nut on the line 6—6 in Fig. 5, showing the improved lock thereon; and Fig. 7 is a detail view of a key used to release the nut lock.

The bolt A, may be of any desired length and its head A', may be hemispherical as shown, or have any other suitable form, and its thread $a$, may be cut to suit a right hand or left hand internally threaded nut B, which can be squared as shown, or be given a hexagonal form if preferred. The locking device consists of a piece of spring wire C, that is inserted through a perforation made in one corner of the nut B, as shown, said perforation being extended through from one end wall of the nut to the other, or if preferred, a part of the corner of the nut may be cut away as shown in Fig. 6, which will permit an ear $b$, to remain which is perforated for the introduction of the spring wire C. One end portion of the spring wire piece C, is bent at a right angle and is preferably embedded in a groove of the nut as indicated at $c$. The portion C' of the wire C, that forms the locking limb is bent at a right angle to the portion which is located in the perforation of the nut B, and is preferably curved slightly near its free end $e$ that is pointed, the curving of said end portion as represented in Figs. 2, 3, 4 and 5, facilitating the engagement of the end $e$, with any one of a series of cupped indentations $i$, that are produced in the bottom of the spiral track of the bolt thread $a$ at proper intervals between the threads. The thread of the bolt A, is continued in a return bent curve $a'$, on the end of the bolt as shown in Fig. 2, which will permit the end $e$, of the nut locking limb C', to readily engage the thread of the bolt and traverse it, by first entering the curved portion $a'$.

When the nut B, is screwed upon the bolt thread $a$, the nut locking limb C', will spring sufficiently to permit the nut to move freely as it is rotated to screw it upon the bolt body, the curved form of the locking limb C', and its plane of approach to the body of the bolt A, serving to prevent a retrograde movement of the nut B, when the end $e$, of the limb C', is embedded in any one of the cupped indentations $i$, such an engagement of parts being represented in Figs. 1, 2 and 3.

A stud or post $h$, is inserted in the end wall of the nut B which is outermost in service, or this projection may be formed integral with the nut, and its projecting body that is cylindrical, being located near the locking limb C', affords a post for the key G, that is provided to release the limb C', from the bolt B; which can be quickly and easily effected by placing the hollow shank of the key over the post, and rotating the key so as to cause the wing $h'$, which projects from it, to press upon the limb C', and spring it away from the bolt, as shown in Fig. 4.

It will be seen, that the nut locking device and releasing implement are co-acting parts of the same invention and independent, one key however serving for the release of an indefinite number of nuts, that may by its use be readily removed from the bolts, and be re-used as frequently as desired.

Having thus described our invention, we claim as new and desire to secure by Letters Patent—

1. A nut lock, comprising a spring limb, the free end of which engages one of a series of cupped indentations in the bottom of the bolt thread engaged by the nut, substantially as described.

2. A nut lock, comprising a series of spaced indentations produced in the bottom of the bolt thread engaged by the nut, and a spring limb adapted to interlock its free end with any one of the indentations and prevent a retrograde movement of the nut until the limb is lifted, substantially as described.

3. The combination with a bolt having cupped indentations at intervals in the bottom of its thread and between the threads, of a nut engaging the thread of the bolt, a spring limb on the nut, the free end of which successively enters the indentations when the nut is screwed on the bolt thread, a post on the nut, and a key adapted to engage the post and by partial rotation lift the spring limb and release the nut, substantially as described.

JOSEPH HARMON.
GEORGE W. FABER.

Witnesses:
BENJAMIN F. SMITH,
CHAS. PETERSON.